(12) United States Patent
Lor et al.

(10) Patent No.: US 11,107,364 B2
(45) Date of Patent: Aug. 31, 2021

(54) METHOD TO ENHANCE FIRST-PERSON-VIEW EXPERIENCE

(71) Applicant: FORMULA SQUARE HOLDINGS LTD, Hong Kong (CN)

(72) Inventors: Felix Wing Keung Lor, Hong Kong (CN); King Leung Tai, Hong Kong (CN); King Hei Tai, Hong Kong (CN); Chun Hong Chan, Hong Kong (CN)

(73) Assignee: FORMULA SQUARE HOLDINGS LTD, Hong Kong (CN)

( * ) Notice: Subject to any disclaimer, the term of this patent is extended or adjusted under 35 U.S.C. 154(b) by 128 days.

(21) Appl. No.: 16/718,128

(22) Filed: Dec. 17, 2019

(65) Prior Publication Data

US 2020/0126443 A1    Apr. 23, 2020

Related U.S. Application Data

(63) Continuation of application No. PCT/CN2019/082791, filed on Apr. 16, 2019.
(Continued)

(51) Int. Cl.
*G09B 19/00*   (2006.01)
*G09B 9/048*   (2006.01)
(Continued)

(52) U.S. Cl.
CPC ......... *G09B 9/048* (2013.01); *H04N 5/23258* (2013.01); *H04N 5/23267* (2013.01); *H04N 5/247* (2013.01)

(58) Field of Classification Search
None
See application file for complete search history.

(56) References Cited

U.S. PATENT DOCUMENTS

| 7,511,610 B2 | 3/2009 | Downey et al. |
| 2015/0346722 A1* | 12/2015 | Herz .................... G05D 1/0027 701/2 |

(Continued)

FOREIGN PATENT DOCUMENTS

| CN | 101335880 | 12/2008 |
| CN | 102087416 A | 6/2011 |

(Continued)

*Primary Examiner* — James B Hull
(74) *Attorney, Agent, or Firm* — Eagle IP Limited; Jacqueline C. Lui (57) ABSTRACT

A system that simulates force feedback of a remote-control vehicle in a motion chair, which includes a plurality of cameras (110,120) mounted on the vehicle (100), an image stabilization module (430) in the vehicle (100), a video processing module (440) in the vehicle (100), an information splitter (514) in the motion chair (570), a motion processing unit (520) in the motion chair (570), a control unit (550) in the motion chair (570), a G-force calculation unit (560) in the motion chair (570) and a force feedback generation unit (540) in the motion chair (570). The motion processing unit (520) calculates six degrees of freedom of motions of the vehicle based on the image stabilization signals generated from the cameras (110,120). The force feedback generation unit (540) produces force feedback signals based on the six degrees of freedom of motions of the vehicle (100) and the G-force calculated by the G-force calculation unit (560).

8 Claims, 8 Drawing Sheets

Related U.S. Application Data (60) Provisional application No. 62/657,946, filed on Apr. 16, 2018.

(51) Int. Cl.
*H04N 5/232* (2006.01)
*H04N 5/247* (2006.01)

(56) References Cited

U.S. PATENT DOCUMENTS

| | | | |
|---|---|---|---|
| 2019/0113975 A1* | 4/2019 | Christensen | A63H 30/04 |
| 2019/0278369 A1* | 9/2019 | Ballard | G06F 3/0346 |

FOREIGN PATENT DOCUMENTS

| | | |
|---|---|---|
| CN | 103405912 A | 11/2013 |
| CN | 103488291 | 1/2014 |
| CN | 103945184 | 7/2014 |
| CN | 104225912 A | 12/2014 |
| CN | 104723952 | 6/2015 |
| CN | 105344101 A | 2/2016 |
| CN | 103959012 | 9/2016 |
| CN | 103854533 | 2/2017 |
| CN | 106999768 | 8/2017 |
| CN | 107134194 | 9/2017 |
| DE | 102016218079 | 12/2017 |
| EP | 0453964 | 10/1991 |
| KR | 10-2018-0011663 | 2/2018 |

* cited by examiner

METHOD TO ENHANCE FIRST-PERSON-VIEW EXPERIENCE

CROSS REFERENCE TO RELATED APPLICATIONS

This application is a Continuation of PCT Application PCT/CN2019/082791 filed on 16 Apr. 2019, which claims priority to, and the benefit of, U.S. Provisional Application Ser. No. 62/657,946 filed on 16 Apr. 2018, entitled METHOD TO ENHANCE FIRST-PERSON-VIEW EXPERIENCE. The entire contents of the foregoing applications are hereby incorporated by reference for all purposes.

FIELD OF TECHNOLOGY

This invention relates to a method that enhances First-person-view (FPV) experience.

BACKGROUND

First-person-view (FPV) is a method to control a radio-controlled vehicle from the driver or pilot's view point. The vehicle may be, for example, a mobile machine, e.g. a car or a drone, either driven or piloted remotely from a first-person perspective via an onboard camera, fed wirelessly to video FPV goggles or a video monitor. New methods and apparatus that assist in advancing technological needs and industrial applications in FPV setups are desirable.

SUMMARY

One example embodiment is a system that simulates force feedback of a remote-control vehicle in a motion chair. The system includes a plurality of cameras mounted on the vehicle, an image stabilization module in the vehicle, a video processing module in the vehicle, an information splitter in the motion chair, a motion processing unit in the motion chair, a control unit in the motion chair, a G-force calculation unit in the motion chair and a force feedback generation unit in the motion chair. The cameras record videos and generate image stabilization signals. The image stabilization module detects the image stabilization signals. The video processing module integrates the videos recorded by the cameras with the image stabilization signals detected by the image stabilization module to generate stabilized videos, and converts the stabilized videos into video signals. The information splitter extracts the image stabilization signals. The motion processing unit calculates six degrees of freedom of motions of the vehicle based on the image stabilization signals extracted from the information splitter. The control unit controls an instantaneous velocity and an instantaneous acceleration of the vehicle. The G-force calculation unit calculates the G-force based on a mass of the vehicle, a mass of a player, the instantaneous velocity and the instantaneous acceleration recorded in the control unit. The force feedback generation unit produces force feedback signals based on the six degrees of freedom of motions of the vehicle and the G-force calculated by the G-force calculation unit. The force feedback is simulated in the motion chair based on the force feedback signals.

Another example embodiment is a method of simulating force feedback of a remote-control vehicle in a motion chair. The method includes recording videos by a plurality of cameras mounted on the vehicle; detecting the image stabilization signals generated from the plurality of cameras by an image stabilization module; calculating six degrees of freedom of motions of the vehicle based on the image stabilization signals by a motion processing unit; controlling an instantaneous velocity and an instantaneous acceleration of the vehicle by a control unit in the motion chair; calculating the G-force based on a mass of the vehicle, a mass of a player, the instantaneous velocity and the instantaneous acceleration recorded in the control unit by a G-force calculation unit; producing force feedback signals based on the six degrees of freedom of motions of the vehicle and the G-force calculated by the G-force calculation unit by a force feedback generation unit in the motion chair; and simulating the force feedback in the motion chair based on the force feedback signals.

In another embodiment, the present invention provides a motion chair that simulates force feedback of a remote-control vehicle. The motion chair includes a motion processing unit, a control unit, a G-force calculation unit and a force feedback generation unit. The motion processing unit calculates six degrees of freedom of motions of the vehicle based on image stabilization signals generated from a plurality of cameras mounted on the vehicle. The control unit controls an instantaneous velocity and an instantaneous acceleration of the vehicle. The G-force calculation unit calculates the G-force based on a mass of the vehicle, a mass of a player, the instantaneous velocity and the instantaneous acceleration recorded in the control unit. The force feedback generation unit produces force feedback signals based on the six degrees of freedom of motions of the vehicle and the G-force calculated by the G-force calculation unit. The force feedback is simulated in the motion chair based on the force feedback signals.

Other embodiments are discussed herein.

DETAILED DESCRIPTION

As used herein, "comprising" means including the following elements but not excluding others.

As used herein and in the claims, "couple" or "connect" refers to electrical coupling or connection either directly or indirectly via one or more electrical means unless otherwise stated.

As used herein, "Optical Image Stabilization" is a mechanism used in a still camera or video camera that stabilizes the recorded image by varying the optical path to the sensor.

As used herein, "Digital Image Stabilization" is a method to analyze the image of different frames in order to determine the optical flow. One simplest way is to shift the electronic image from frame to frame of video, enough to counteract the motion. It uses pixels outside the border of the visible frame to provide a buffer for the motion. This technique reduces distracting vibrations from videos by smoothing the transition from one frame to another. It requires image segmentation and optical flow detection.

Because of analyzing image frames, it needs more computational resources and memory buffers to achieve a better stabilization.

As used herein, "Electronic Image Stabilization" is real-time digital image stabilization using electronics instead of analyzing image frames.

As used herein, "gyroscopes-based technique for image stabilization" is an optomechanical technique that operates a gyroscopic means to provide an inertial reference for stabilization of a body.

As used herein, "G-force" is a vector acceleration exerted on an object which is produced by a mechanical force due to the change of velocity.

As used herein, "force feedback" are some feedbacks as a type of reactional force during interaction. This allows the haptic simulation of objects, textures, recoil, momentum, and the physical presence of objects in games. It brings a user immerse into the virtual environment with the sense of the presence of the real world interaction.

With more games entering the competitive gaming field, FPV racing is one of the most popular multiplayer video game genres associated with eSports. Most of FPV systems just provide images through a virtual reality or a video headset. The player immerses only in the view of the pilot or driver to control the vehicle. However, other aspects of driving or navigating experience cannot be felt by the player.

To increase the presence of playing FPV vehicle racing, full motion force feedback chair is integrated into the player platform in example embodiments. Example embodiments integrate a motion simulation chair in order to make the player feeling himself sitting in the cockpit and sensing the G-force of the motion exerted by the vehicle on the player.

Example embodiments allow the creation of more immersive systems. Except the stimulation of two senses, namely sight and hearing, that usually present in the FPV systems with a headset, example embodiments include actuators embedded at discrete locations in a motion chair to provide a wide range of haptic effects to the user.

The challenge of integrating a full motion force feedback chair is to detect the motion of the racing vehicle and then transmit to a control device with accurate motion signals. Weight balance is a key component of any race setup strategy. If motion gyro sensors are implemented onto the racing vehicle for the detection of its motion, the weight of the racing vehicle increases which compromises its velocity and so forth. Thus, it is not desirable to have additional motion gyro sensors implemented in the racing vehicle.

Another challenge is to transmit the motion of the racing vehicle with low latency rate. If motion gyro sensors are implemented onto the vehicle, transmission of motion sensing signals would append the burden of data transmission.

Example embodiments solve the above-stated problems or difficulties by providing new methods and systems to reduce the amount of data transfer and transmit the accurate motion signals to the control platform. Because of the speedy motion, image and video stabilization must be applied in the racing. Otherwise, the image or video captured would become obscure. In order to reduce the motion blur, video or image stabilization is applied. Example embodiments can adopt any types of stabilization techniques, such as Optical Image Stabilization (OIS), Digital Image Stabilization (DIS) and Electronic Image Stabilization (EIS). Among these image stabilization methods, DIS and EIS comparatively require more amounts of data buffer and computing power that decrease the latency rate.

Methods and systems in example embodiments can also adopt Vestibule Ocular Reflex (VOR). Analogous to human eye image stabilization mechanism, VOR and optokinetic reflex (OKR) are the feedback mechanism to stabilize the images while the movement of the head is detected. VOR is used for the fast response while OKR is to ensure the eye moves in the same direction and at almost the same speed as the image moves. It is mainly deal with slow movement of head. The translational shift and rotational movement of the vehicle can be calculated based upon the stabilization reflex signals in example embodiments.

Example embodiments use image stabilization signals to generate force feedback motion, in which tiny motions can be captured with short response time.

Figure 1:
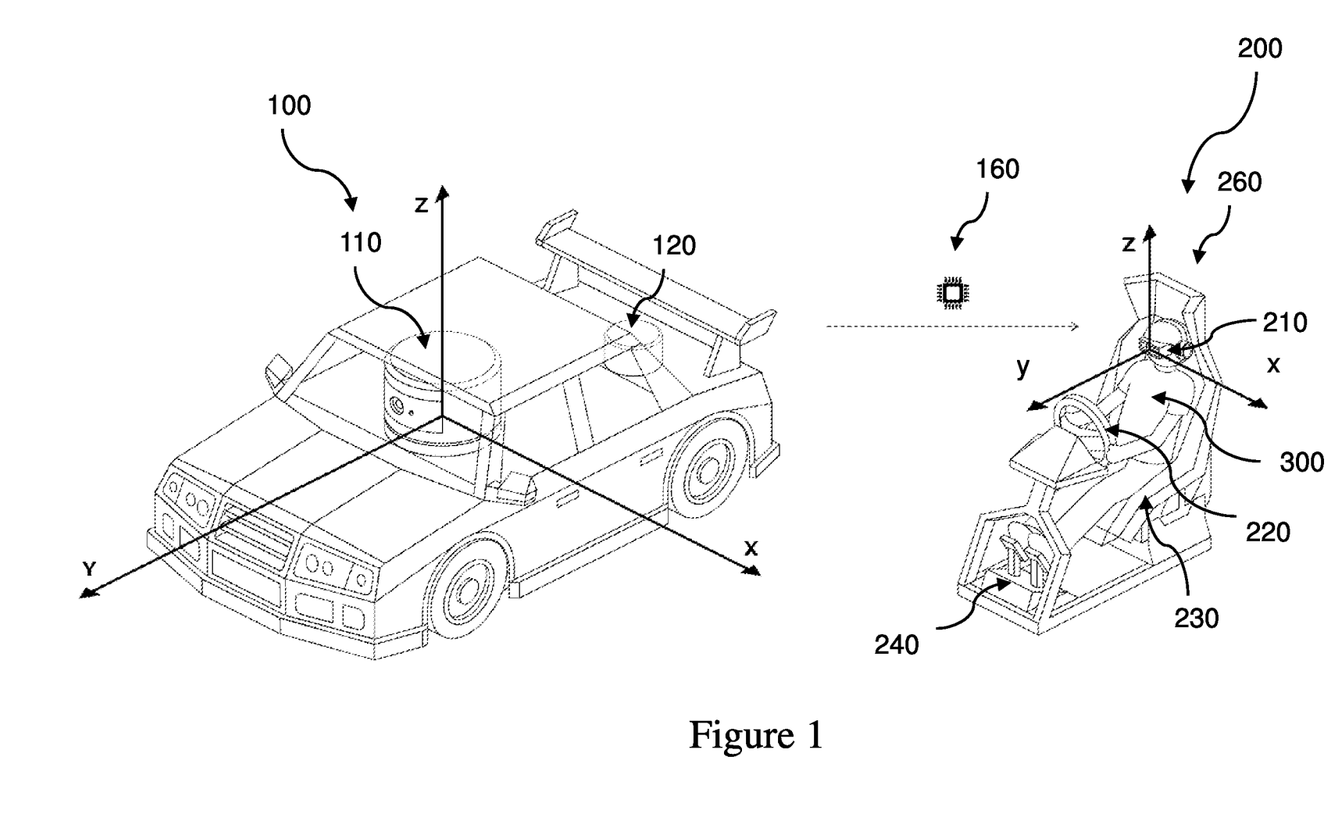
FIG. 1 shows a system that uses image stabilization to generate force feedback in a motion simulator in a FPV system in accordance with an example embodiment.

Referring to FIG. 1, an example embodiment shows a system that uses image stabilization to generate force feedback in a motion simulator in a FPV system. The system comprises a remote control vehicle 100 and a motion control platform 200 where a player 300 sits in a motion simulator 230 and senses the force feedback. The remote control vehicle 100 includes a front view camera 110 and a rear view camera 120 mounted on the vehicle 100, an image stabilization module, a video processing module and a transmitter (not shown in FIG. 1) installed in the vehicle 100. The front view camera 110 is located in the center view of the vehicle 100. The front view camera 110, center of mass of the vehicle 100 and the rear view camera 120 are not aligned along a straight line so that both cameras can detect different degree of freedom (DoF) of motions. The front view camera 110 and the rear view camera 120 are coupled to the image stabilization module and a video processing module. The image stabilization module detects an image stabilization signal which indicates an image stabilization angle shift. The image stabilization angle shift is an opposite movement of the image formed in a camera. By way of example, if the image stabilization angle is shifted to positive y-axis, the movement of the image formed in the front view camera 110 corresponds to the negative y-axis direction. The video processing module receives the image stabilization signals from the image stabilization module and generates stabilized videos by integrating the image stabilization signals with the videos captured by the cameras 110 and 120. The transmitter transmits the image stabilization signals from the image stabilization module and the stabilized videos from the video processing module through a network 160.

In the example embodiment shown in FIG. 1, the motion control platform 200 includes a video display headset 210, a steering wheel 220, a motion simulator 230, pedals 240, a motion processing unit (not shown in FIG. 1) and a receiver (not shown in FIG. 1) installed in the motion control platform 200. The receiver receives the image stabilization signals and the stabilized videos from the transmitter of the vehicle 100. The player 300 can immerse in the view of a pilot or a driver of the vehicle 100 through a video display headset 210 and control the movement of the vehicle 100 through the steering wheel 220 and the pedals 240. The video display headset 210 is a head-mounted device that communicates with the motion control platform 200 via wireless link or wired link and displays the stabilized videos. In addition, the player 300 sits in the motion simulator 230 can feel himself sitting in a cockpit in the vehicle 100 by receiving the force feedback. The force feedback generated from the motion simulator 230 is an integration of six degrees of freedom (6 DoF) of motion of the vehicle 100 and the G-force motion exerted by the steering wheel 220 and the pedals 240. The pedals 240 include but not limited to acceleration pedal and brake pedal.

Figure 2A:
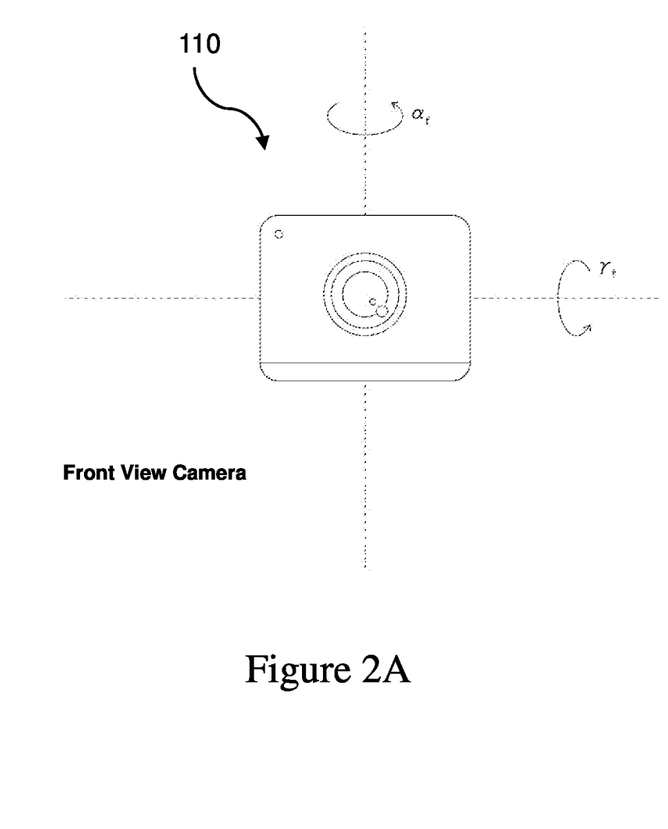
FIG. 2A shows the front view camera with image stabilization in accordance with the example embodiment shown in FIG. 1.
Figure 2B:
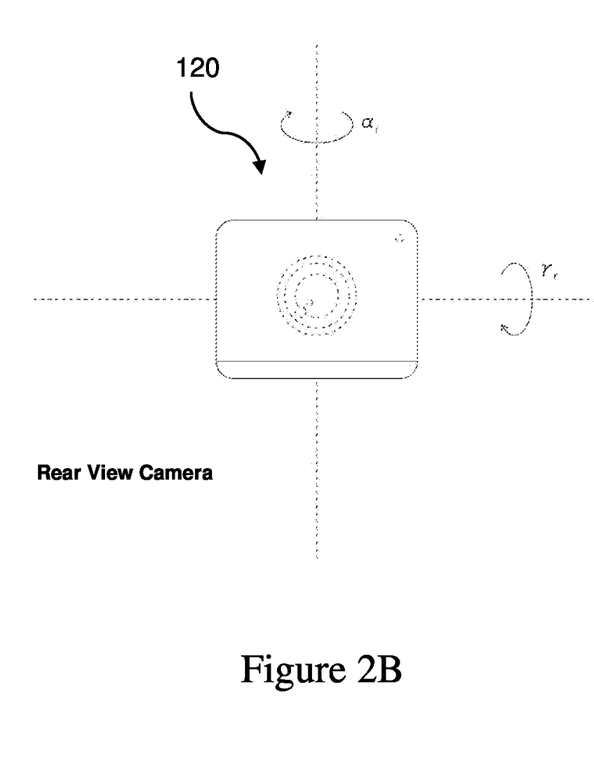
FIG. 2B shows the rear view camera with image stabilization in accordance with the example embodiment shown in FIG. 1.

FIGS. 2A and 2B show the front view camera 110 and the rear view camera 120 respectively in the example embodiment shown in FIG. 1 and uses the same reference characters as in FIG. 1 to indicate the same elements. As shown in FIG. 2A, the image stabilization angle shift of the front view camera 110 is defined as $(\alpha_f, \gamma_f)_f$. As shown in FIG. 2B, the image stabilization angle shift of the rear view camera 120 is defined as $(\alpha_r, \gamma_r)_r$.

Figure 3:
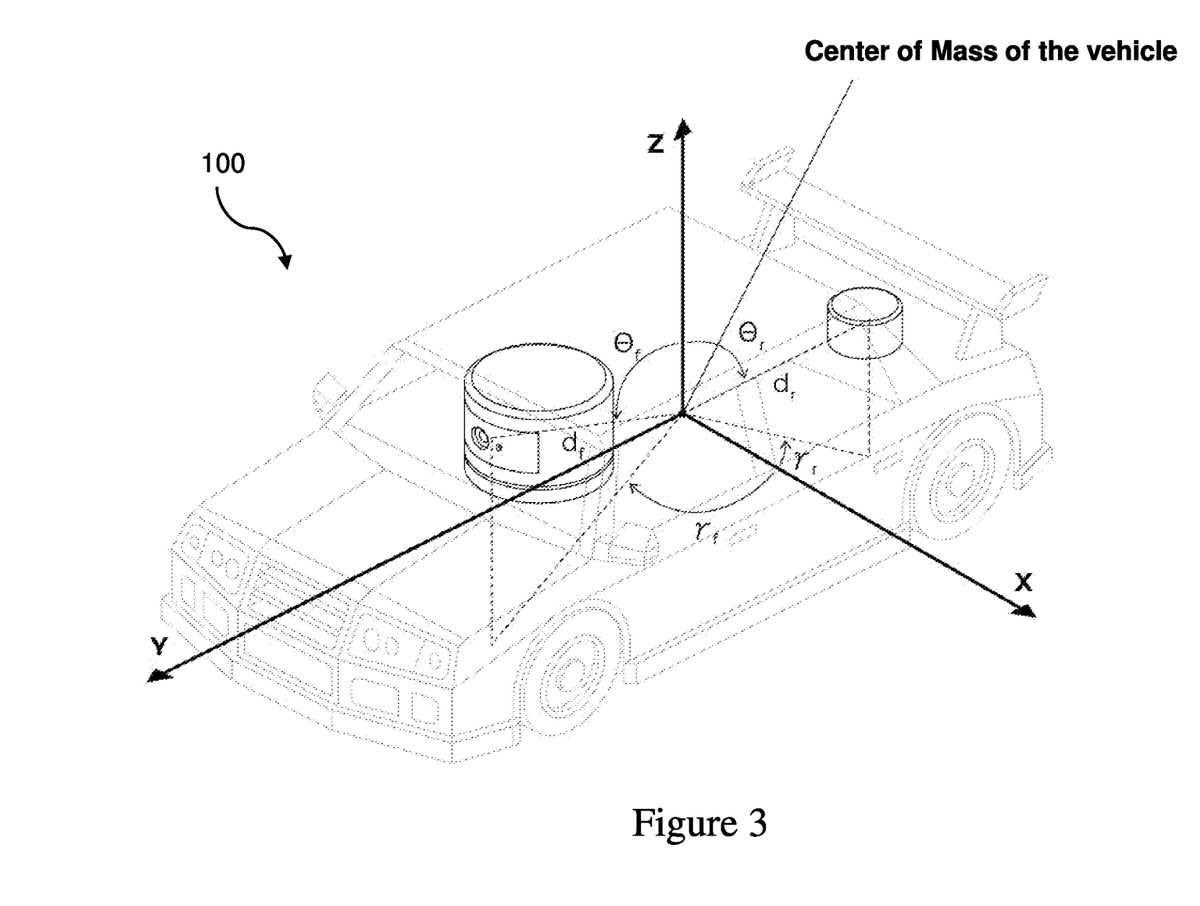
FIG. 3 shows the position of the front view camera and the rear view camera of the vehicle with respect to the body frame of the vehicle in accordance with the example embodiment shown in FIG. 1.

FIG. 3 shows the front view camera 110 and the rear view camera 120 in the example embodiment shown in FIG. 1 and uses the same reference characters as in FIG. 1 to indicate the same elements. The coordinates of the front view camera 110 with respect to the body framework of the vehicle 100 are $[d_f, \theta_f, \varphi_f]$, and the coordinates of the rear view camera 120 with respect to the body framework of the vehicle 100 are $[d_r, \theta_r, \varphi_r]$, where $d_f, \theta_f, \varphi_f, d_r, \theta_r$ and $\varphi_r$ are the spherical coordinates respect to the center of mass of the vehicle, $$\theta_r \neq -\theta_f, \varphi_r \neq -\varphi_f, \varphi_f = \frac{\pi}{2}.$$

Figure 4:
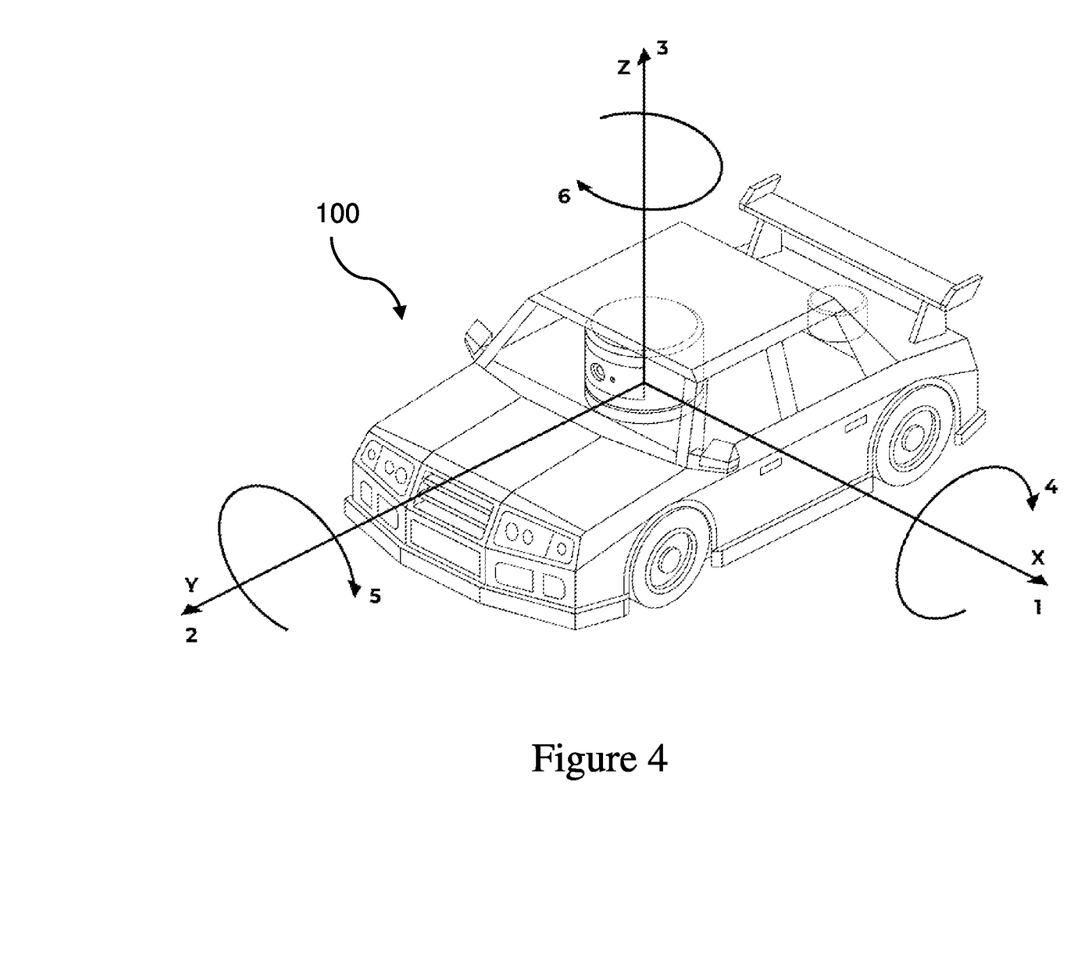
FIG. 4 shows the six degrees of freedom (6 DoF) motions of the remote control vehicle in accordance with the example embodiment shown in FIG. 1.

FIG. 4 shows the 6 DoF of motion of the vehicle 100 in the example embodiment shown in FIG. 1 and uses the same reference characters as in FIG. 1 to indicate the same elements. Consider the body framework of the vehicle 100, 6 DoF are defined as $\{x,y,z|\Omega_x,\Omega_y,\Omega_z\}$, where (x,y,z) are the x-axis, y-axis and z-axis of sway (1), surge (2) and heave (3) translational motions while $(\Omega_x,\Omega_y,\Omega_z)$ are roll (4), pitch (5) and yaw (6) rotational motions, respectively. The 6 DoF are converted from the image stabilization signals in the motion processing unit in the motion control platform 200 in FIG. 1.

For the translation motions of the vehicle 100, the motions are transformed by:

$$\{x, 0, 0 | 0, 0, 0\} \Leftrightarrow \left(\cos^{-1} \frac{d_f}{\sqrt{x^2 + d_f^2 \sin^2\theta_f + d_f^2}}, \tan^{-1} \frac{d_f \sin\theta_f}{-x}\right)_f$$

$$\left(\cos^{-1} \frac{d_r \cos\theta_r}{\sqrt{(d_r \sin\theta_r \cos\varphi_r - x)^2 + d_r^2 \sin^2\theta_r \sin^2\varphi_r + d_r^2 \cos^2\theta}}, \tan^{-1} \frac{d_r \sin\theta_r \sin\varphi_r}{d_r \sin\theta_r \cos\varphi_r - x}\right)_r$$

$$\{0, y, 0 | 0, 0, 0\} \Leftrightarrow \left(\cos^{-1} \frac{d_f}{\sqrt{(d_f \sin\theta_f - y)^2 + d_f^2}}, \pm\frac{\pi}{2}\right)_f$$

$$\left(\cos^{-1} \frac{d_r \cos\theta_r}{\sqrt{d_r^2 \sin^2\theta_r \cos^2\varphi_r + (d_r \sin\theta_r \sin\varphi_r - y)^2 + d_r^2 \cos^2\theta_r}}, \tan^{-1} \frac{d_r \sin\theta_r \sin\varphi_r - y}{d_r \sin\theta_r \cos\varphi_r}\right)_r$$

$$\{0, 0, z | 0, 0, 0\} \Leftrightarrow \left(\cos^{-1} \frac{d_f - z}{\sqrt{d_f^2 \sin^2\theta_f + (d_f - z)^2}}, \pm\frac{\pi}{2}\right)_f$$

$$\left(\cos^{-1} \frac{d_r \cos\theta_r - z}{\sqrt{d_r^2 \sin^2\theta_r \cos^2\varphi_r + d_r^2 \sin^2\theta_r \sin^2\varphi_r + (d_r \cos^2\theta - z)^2}}, \tan^{-1} \frac{d_r \sin\theta_r \sin\varphi_r}{d_r \sin\theta_r \cos\varphi_r}\right)_r$$

For the rotational motions of the vehicle 100, the motions are transformed by:

$$\{0, 0, 0 | \Omega_x, 0, 0\} \Leftrightarrow \left(\cos^{-1} \frac{d_f - \cos\Omega_x}{\sqrt{(d_f \sin\theta_f - \sin\Omega_x)^2 + (d_f - \cos\Omega_x)^2}}, \pm\frac{\pi}{2}\right)_f$$

$$\left(\cos^{-1} \frac{d_r \cos\theta_r - \cos\Omega_x}{\sqrt{d_r^2 \sin^2\theta_r \cos^2\varphi_r + (d_r \sin\theta_r \sin\varphi_r - \sin\Omega_x)^2 + (d_r \cos\theta_r - z)^2}}, \tan^{-1} \frac{d_r \sin\theta_r \sin\varphi_r - \sin\Omega_x}{d_r \sin\theta_r \cos\varphi_r}\right)_r$$

$$\{0, 0, 0 | \Omega_x, 0, 0\} \Leftrightarrow \left(\cos^{-1} \frac{d_f - \cos\Omega_x}{\sqrt{(d_f \sin\theta_f - \sin\Omega_x)^2 + (d_f - \cos\Omega_x)^2}}, \pm\frac{\pi}{2}\right)_f$$

$$\left(\cos^{-1} \frac{d_r \cos\theta_r - \cos\Omega_x}{\sqrt{d_r^2 \sin^2\theta_r \cos^2\varphi_r + (d_r \sin\theta_r \sin\varphi_r - \sin\Omega_x)^2 + (d_r \cos\theta_r - z)^2}}, \tan^{-1} \frac{d_r \sin\theta_r \sin\varphi_r - \sin\Omega_x}{d_r \sin\theta_r \cos\varphi_r}\right)_r$$

$$\{0, 0, 0 | \Omega_x, 0, 0\} \Leftrightarrow \left(\cos^{-1} \frac{d_f - \cos\Omega_x}{\sqrt{(d_f \sin\theta_f - \sin\Omega_x)^2 + (d_f - \cos\Omega_x)^2}}, \pm\frac{\pi}{2}\right)_f$$

$$\left(\cos^{-1} \frac{d_r \cos\theta_r - \cos\Omega_x}{\sqrt{d_r^2 \sin^2\theta_r \cos^2\varphi_r + (d_r \sin\theta_r \sin\varphi_r - \sin\Omega_x)^2 + (d_r \cos\theta_r - z)^2}}, \tan^{-1} \frac{d_r \sin\theta_r \sin\varphi_r - \sin\Omega_x}{d_r \sin\theta_r \cos\varphi_r}\right)_r$$

The above transformations list the relationships of the image stabilization signals of both front view camera and rear view camera corresponding to the linear component motion of the vehicle.

In another example embodiment, more cameras are installed and below transformations are used for error correction.

$$\begin{pmatrix} x \\ y \\ z \\ \Omega_x \\ \Omega_y \\ \Omega_z \end{pmatrix} = \begin{bmatrix} M_{1,1} & M_{1,2} & \cdots & M_{1,2n-1} & M_{1,2n} \\ M_{2,1} & M_{2,2} & \cdots & M_{2,2n-1} & M_{2,2n} \\ \vdots & & \ddots & & \vdots \\ M_{5,1} & M_{5,2} & \cdots & M_{5,2n-1} & M_{5,2n} \\ M_{6,1} & M_{6,2} & \cdots & M_{6,2n-1} & M_{6,2n} \end{bmatrix} \begin{pmatrix} \alpha_1 \\ \gamma_1 \\ \vdots \\ \alpha_n \\ \gamma_n \end{pmatrix}$$

where $$R = \begin{pmatrix} x \\ y \\ z \\ \Omega_x \\ \Omega_y \\ \Omega_z \end{pmatrix}$$

the motion vector of the vehicle, $$M = \begin{pmatrix} M_{1,1} & M_{1,2} & \cdots & M_{1,2n-1} & M_{1,2n} \\ M_{2,1} & M_{2,2} & \cdots & M_{2,2n-1} & M_{2,2n} \\ \vdots & & \ddots & & \vdots \\ M_{5,1} & M_{5,2} & \cdots & M_{5,2n-1} & M_{5,2n} \\ M_{6,1} & M_{6,2} & \cdots & M_{6,2n-1} & M_{6,2n} \end{pmatrix}$$

is the correlation matrix and $$S = \begin{pmatrix} \alpha_1 \\ \gamma_1 \\ \vdots \\ \alpha_n \\ \gamma_n \end{pmatrix}$$

is the image stabilization vector.

Moore-Penrose method is used to construct the pseudo-inverse:

$$(M^T M)^{-1} M^T R = S$$

Figure 5:
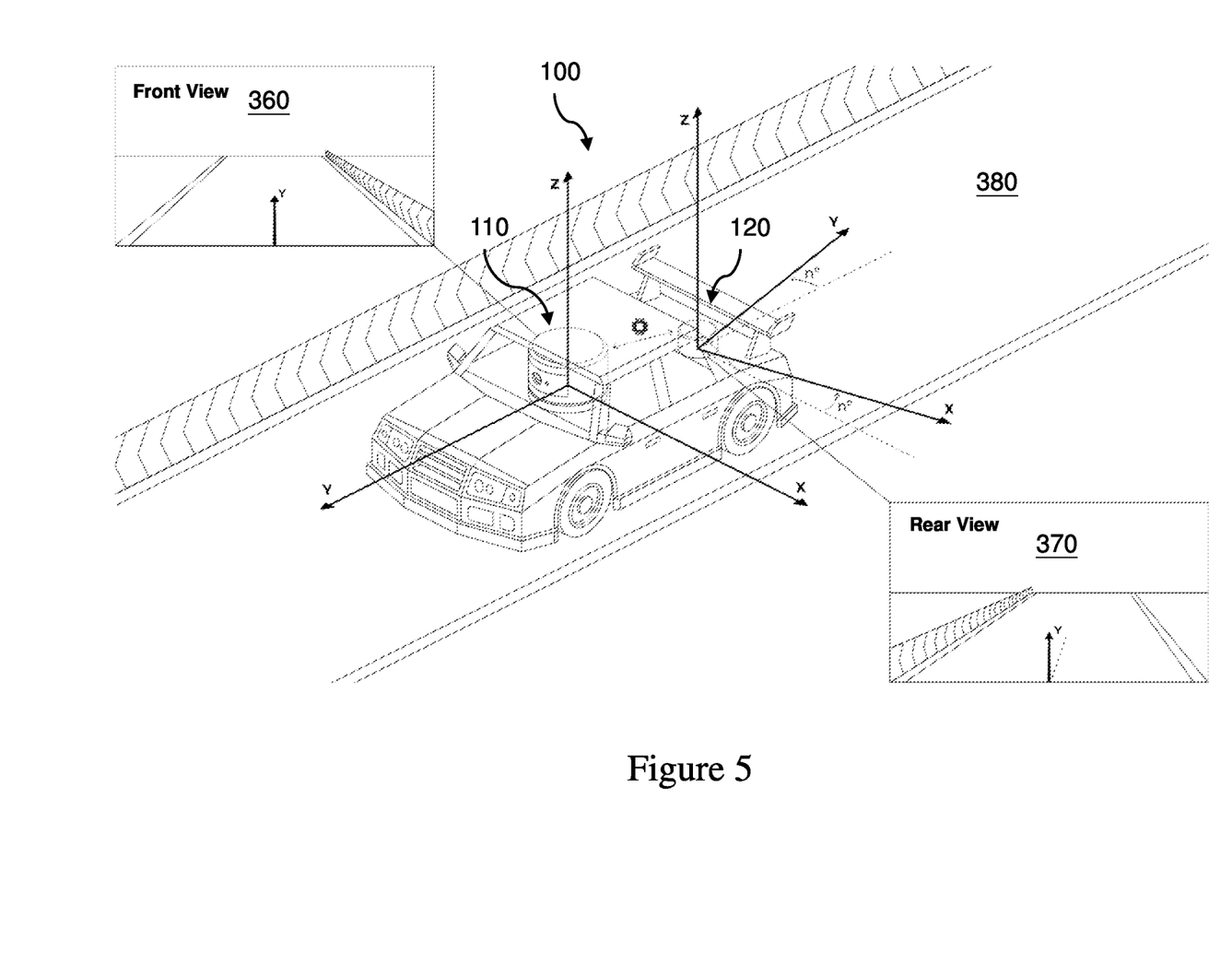
FIG. 5 shows the remote control vehicle in a racing track, the front view and the rear view captured by the cameras in accordance with the example embodiment shown in FIG. 1.

FIG. 5 shows the vehicle 100 in the example embodiment of FIG. 1 in a racing track 380 and uses the same reference characters as in FIG. 1 to indicate the same elements. The rear view camera 120 is implemented in a way that is not aligned with a straight line between the front view camera 110 and the center of mass of the vehicle 100 such that all motions can be detected and distinguished. FIG. 5 also shows the front view 360 captured by the camera 110 and the rear view 370 captured by the camera 120 at an angle n° in respect to the straight line between the front view camera 110 and the center of mass of the vehicle 100.

Figure 6:
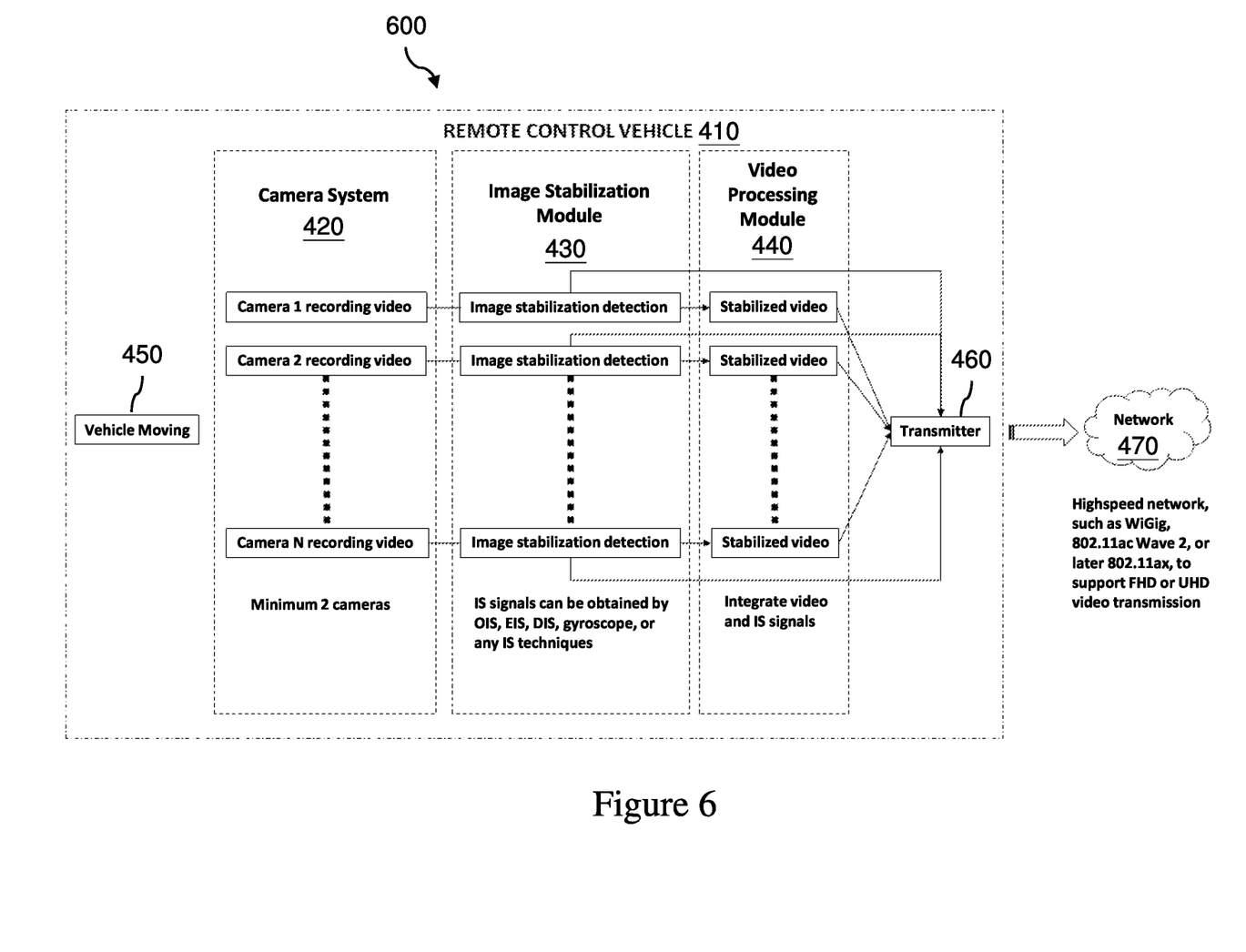
FIG. 6 shows a method of obtaining image stabilization signals from a moving vehicle in a FPV system in accordance with an example embodiment.
Figure 7:
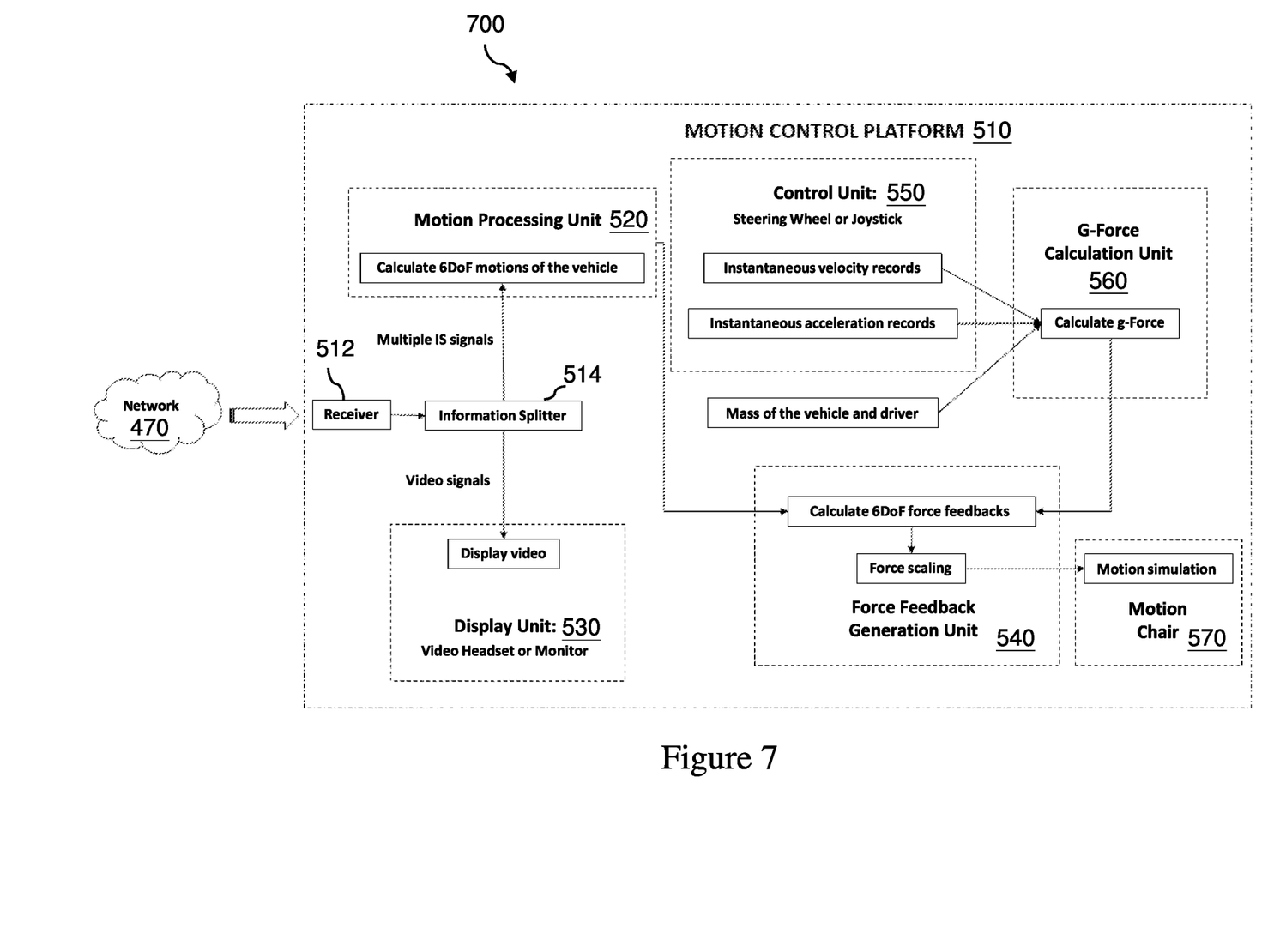
FIG. 7 shows a method of generating force feedback motion in a motion chair in accordance with the example embodiment shown in FIG. 6.

Referring now to flow chart 600 in FIG. 6 and flow chart 700 in FIG. 7, another example embodiment shows a method that generates force feedback motion in a motion chair by obtaining image stabilization signals in a FPV system.

FIG. 6 shows a remote control vehicle 410 that includes a camera system 420, an image stabilization module 430 and a video processing module 440 in the example embodiment. The camera system 420 records videos by a plurality of cameras 1, 2 . . . N implemented on a vehicle 410 while it is moving. The image stabilization module 430 detects image stabilization signals for the videos recorded by the cameras and sending the image stabilization signals to the video processing module 440 and the transmitter 460. The image stabilization signals can be obtained by OIS, EIS, DIS or gyroscopes-based technique for image stabilization. The video processing module 440 integrates the videos recorded by the cameras with the image stabilization signals and generates a plurality of stabilized videos corresponding to the plurality of cameras. The video processing module 440 converts the plurality of stabilized videos into video signals and sends to the transmitter 460 through a network 470. By way of example, the network 470 is a highspeed network, e.g. WiGig, 802.11ac Wave 2, or 802.11ax to support Full High Definition (FHD) or Ultra High Definition (UHD) video transmission.

FIG. 7 shows a motion control platform 510 that includes a receiver 512, an information splitter 514, a motion processing unit 520, a display unit 530, a force feedback generation unit 540, a control unit 550, a G-force calculation unit 560 and a motion chair 570 in the example embodiment. The receiver 512 receives image stabilization signals and the video signals through the network 470 from the transmitter 460 and sends them to the information splitter 514. The information splitter 514 extracts and sends the video signals to the display unit 530 and the plurality of the image stabilization signals to the motion processing unit 520. The display unit 530 includes but not limited to a video headset or a monitor. The display unit 530 can be selected to display the plurality of stabilized videos respectively. It displays the videos captured to the pilot or the driver sitting in the motion chair. The motion processing unit 520 calculates 6 DoF of motion of the vehicle 410 based on the image stabilization signals and sends the 6 DoF of motion of the vehicle 410 to the force feedback generation unit 540. The control unit 550 includes but not limited to steering wheel or joystick. The control unit 550 records the instantaneous velocity records, the instantaneous acceleration records and the mass of the vehicle and the driver which are sent to the G-force calculation unit 560. The G-force calculation unit 560 calculates the G-force based upon the acceleration of real vehicle and sends the G-force to the force feedback generation unit 540. The force feedback generation unit 540 scales the 6 DoF of motion of the vehicle 410 ($\vec{S}$) with the G-force ($\vec{G}$) to produce force feedback signals ($\vec{F}$) by: $\vec{F} = \vec{G} \otimes \vec{S}$. For example, $$M \cdot \vec{F} = \vec{S}$$

$\vec{G}$ is the g-force that can modify the force feedback signals by $$\vec{F} = (M^T M)^{-1} M^T \cdot \vec{S} + [I - (M^T M)^{-1} M^T M] \cdot \vec{G}$$

This is analogous to human. Vision can be used to determine the motion while semi-circular canals inside our ears can detect the motion as well. Our brain integrates both signals to give us the perception of motion.

The force feedback signals are sent to the motion chair 570 to simulate the force feedback motion of the vehicle 410.

It should be understood for those skilled in the art that the division between hardware and software is a conceptual division for ease of understanding and is somewhat arbitrary. Moreover, it will be appreciated that peripheral devices in one computer installation may be integrated to the host computer in another. Furthermore, the present disclosure may also be deployed in a distributed computing environment that includes more than one data processing devices connected together through one or more networks. The networks can include one or more of the internet, an intranet, an extranet, a cellular network, a local area network (LAN), a home area network (HAN), metropolitan area network (MAN), a wide area network (WAN), a Bluetooth network, public and private networks, etc. The software program and its related databases can be stored in a separate file server or database server and is transferred to the local host for execution. The image stabilization module 430, the video processing module 440 as shown in FIG. 4 and the motion processing unit 520, the G-force calculation unit 560 and the force feedback generation unit 540 as shown in FIG. 5 are therefore only an exemplary embodiment of how the present invention can be implemented. Those skilled in the art will appreciate that alternative embodiments can be adopted to implement the present invention.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

Methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

By way of example, the motion chair or motion simulator includes but not limited to a form of chair. The motion chair or motion simulator generates force feedback which can represent an intensity of vibrations of the remote control vehicle. Also, one or more parts of the motion chair, or an entire of the motion chair can generate force feedback motion. By way of example, the motion chair or motion simulator includes several haptic devices, such as a fan that provides a wind effect.

Figure 8:
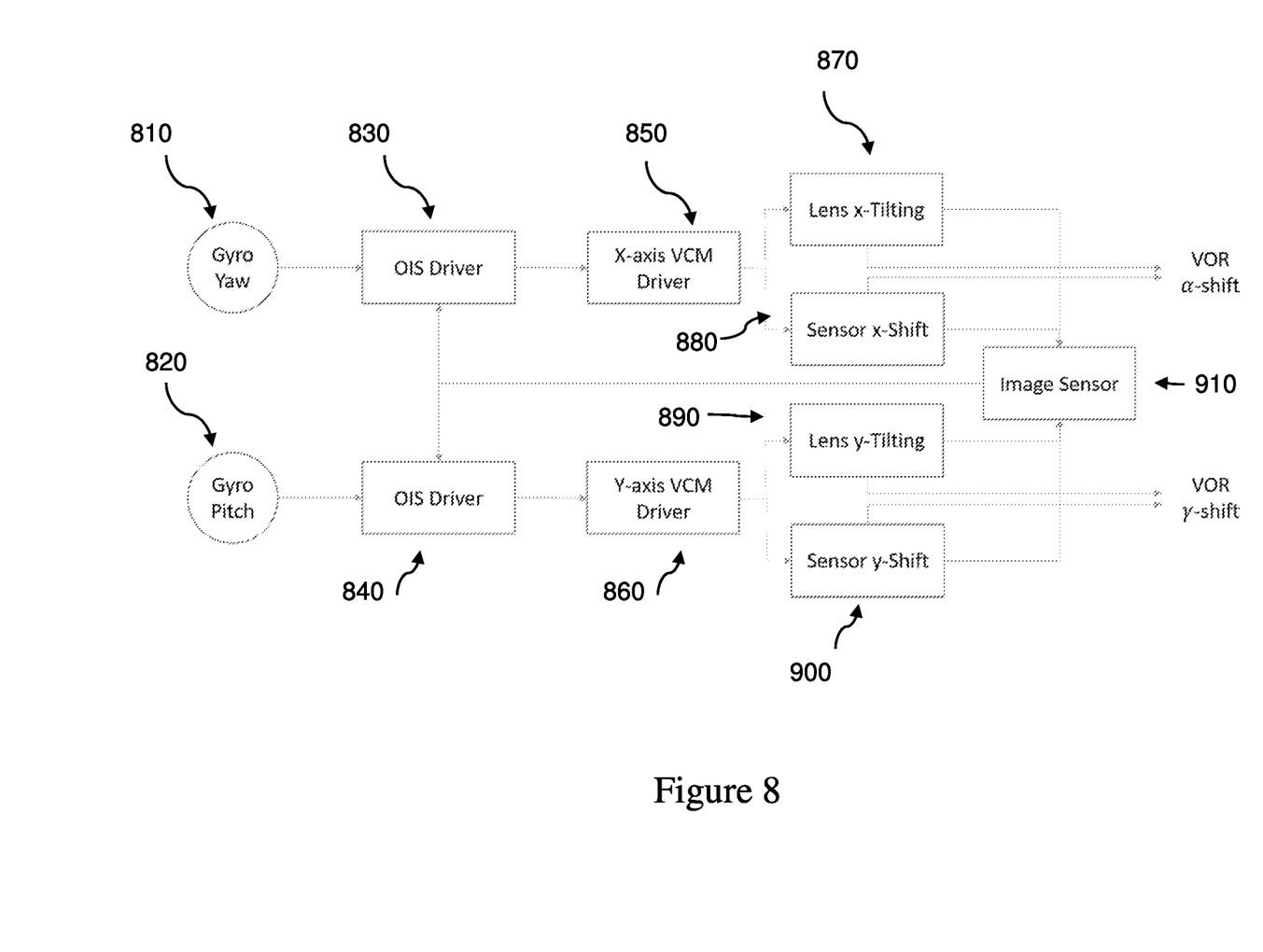
FIG. 8 shows two types of Vestibule Ocular Reflex (VOR) setups in accordance with an example embodiment.

By way of example, the image stabilization angle shift of the camera can be measured from VOR setups in example embodiments. FIG. 8 shows two types of VOR setups: one is moving the lens while the other is to move the sensor. The gyro sensors 810, 820 of a camera sense a yaw and a pitch motion and sends the signal to the optical image stabilization (OIS) drivers 830, 840 of the camera to control an x-axis voice coil motor driver (VCM) driver 850 and a y-axis VCM driver 860 respectively. The x-axis VCM driver 850 controls a tilting of a lens in x-direction or a shift of a sensor in x-direction to produce a a-shift. The y-axis VCM driver 860 controls a tilting of a lens in y-direction or a shift of a sensor in y-direction to produce a y-shift. The optical image stabilization (OIS) drivers 830, 840 of the camera couple with the image sensor 910 of the camera. The motors 870, 880, 890, 900 are for the tilting of the lens in x-direction, the shift of the sensor in x-direction, the tilting of the lens in y-direction, the shift of the sensor in y-direction respectively. The motors 870, 880, 890, 900 couple with the image sensor 910. The image sensor 910 detects and conveys the information that constitutes an image and sends the image stabilization signal to the image stabilization module in the example embodiments.

By way of example, when the camera effects a motion in an example embodiment, the velocity of the camera is monitored by a sensor. The output signal of the sensor is sent to a sensor process circuit and is converted therein into a target drive position signal for the optical system. On the other hand, the position of the optical system is monitored by a position detecting element. The position signal monitored by the position detecting element and the target drive position signal is sent to a control unit, which sends a control signal to a driver circuit so as to reduce the difference of these two signals. In response to the control signal, the driver circuit drives an actuator for driving the optical system to allow a constant image position to be maintained despite the pitching motion of the camera. By way of example, the image stabilization signal in the example embodiment is the target drive position signal.

By way of example, to correct for camera motion, reference objects in the frame of the video that are assumed to be stationary can be used to determine the apparent camera motion signal in an example embodiment. This apparent camera motion signal can then be subtracted from the displacement signal of the structure of interest and converted to image stabilization signals in the example embodiment.

By way of example, a method of real-time stabilizing a vibrating image in an example embodiment includes positioning nine fixed observation blocks (FOB) of an input video image, selecting one FOB as a feature block (FB), utilizing block matching to find a motion vector of the FB, utilizing the motion vector to restore an offset of the input video image caused by vibration, and displaying the restored input video image on a display. The image stabilization signals in the example embodiment corresponds to the motion vector.

As used herein, "motion chair" can be a dynamic sensory motion seat or chair.

What is claimed is:

1. A method of simulating force feedback of a remote-control vehicle in a motion simulator comprising a chair, comprising:
    recording, by a plurality of cameras mounted on the remote-control vehicle, videos;
    detecting, by an image stabilization module, image stabilization signals generated from the plurality of cameras;
    calculating, by a motion processing unit, six degrees of freedom of motions of the remote-control vehicle based on the image stabilization signals;
    controlling, by a control unit in the motion simulator, an instantaneous velocity and an instantaneous acceleration of the remote-control vehicle;
    calculating, by a G-force calculation unit, the G-force based on a mass of the remote-control vehicle, a mass of a player sitting in the motion simulator, the instantaneous velocity and the instantaneous acceleration recorded in the control unit;
    producing, by a force feedback generation unit in the motion simulator, force feedback signals based on the six degrees of freedom of motions of the remote-control vehicle and the G-force calculated by the G-force calculation unit;
    generating, from the motion simulator, a force feedback based on the force feedback signals; and receiving, by the player sitting in the chair of the motion simulator, the force feedback.

2. The method of cairn 9, wherein the plurality of cameras include a front view camera and a rear vim camera, wherein the rear view camera is implemented in a way that is not aligned with a straight line between the front view camera and the center of mass of the remote-control vehicle so that both cameras can detect different degrees of freedom of motions.

3. The method of claim 1 further comprising:
integrating, by a video processing module in the remote-control vehicle, videos recorded by the plurality of cameras with the image stabilization signals detected by the image stabilization module in the remote-control vehicle to generate stabilized videos;
converting, by the video processing module, the stabilized videos into video signals; and
transmitting, by a transmitter connected with the video processing module in the remote-control vehicle, the video signals via a network to a receiver in the motion simulator.

4. The method of claim 1 further comprising:
transmitting, by a transmitter connected with the image stabilization module, the image stabilization signals detected by the image stabilization module in the remote-control vehicle via a network to a receiver in the motion simulator.

5. The method of claim 1 further comprising:
transmitting, from a receiver in the motion simulator to an information splitter in the motion simulator, the image stabilization signals and video signals, wherein the video signals are converted from stabilized videos, the stabilized videos are an integration of the videos recorded by the cameras and the image stabilization signals generated from the cameras;
extracting and sending, by the information splitter, the image stabilization signals to the motion processing unit; and
extracting and sending, by the information splitter, the video signals to a display unit in the motion simulator.

6. The method of claim 5, wherein the display unit is a headset.

7. The method of claim 1, wherein the force feedback signals ($\vec{F}$) is calculated by:

$$\vec{F} = \vec{G} \otimes \vec{S}$$

where ($\vec{G}$) denotes the F force, ($\vec{S}$) denotes the six degrees of freedom of motions of the remote-control vehicle.

8. The method of claim 1, wherein the image stabilization module detects the image stabilization signals which indicate image stabilization angle shifts, the image stabilization angle shifts of the camera are measured from Vestibule Ocular Reflex setups.

* * * * *